C. F. SCHELL.
OILING SYSTEM.
APPLICATION FILED JAN. 26, 1918.
1,340,687.
Patented May 18, 1920.
2 SHEETS—SHEET 2.
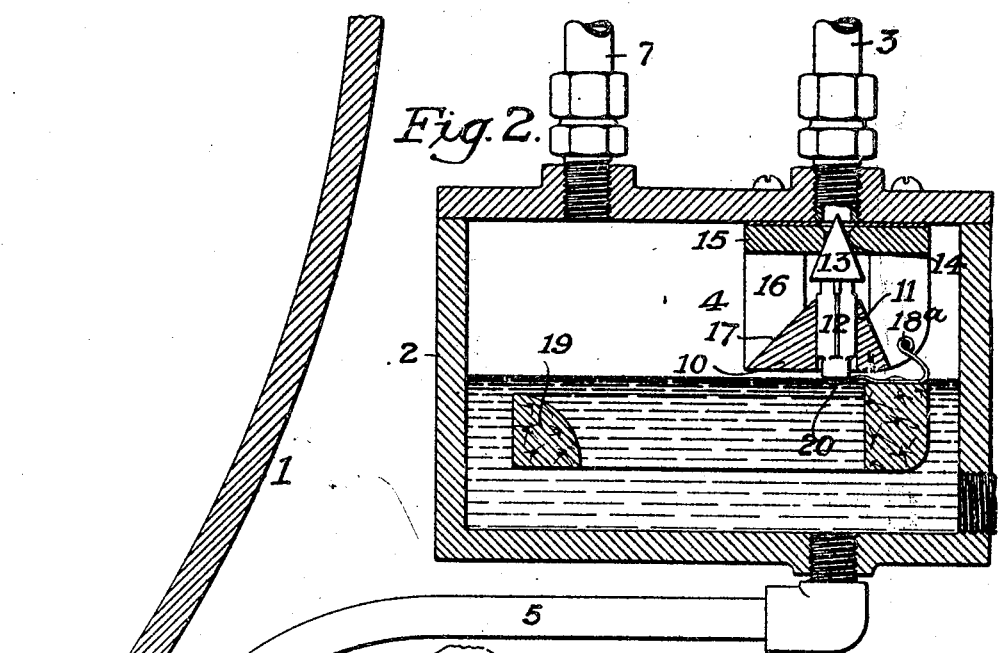
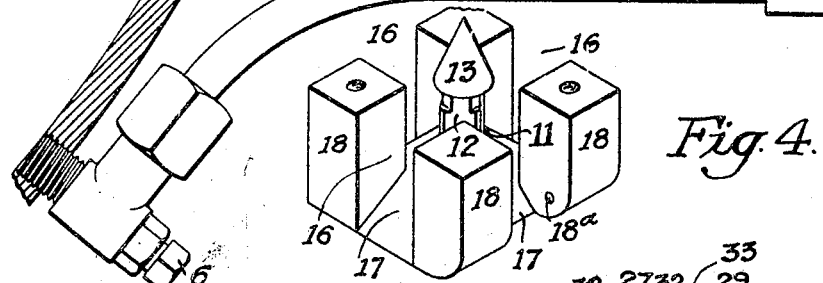
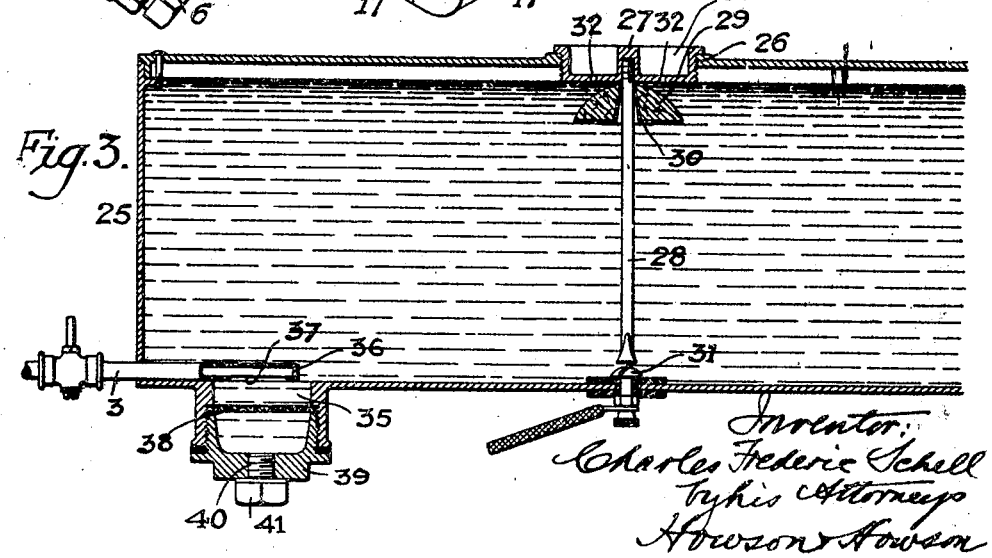
Inventor,
Charles Frederic Schell
By his Attorneys
Howson & Howson

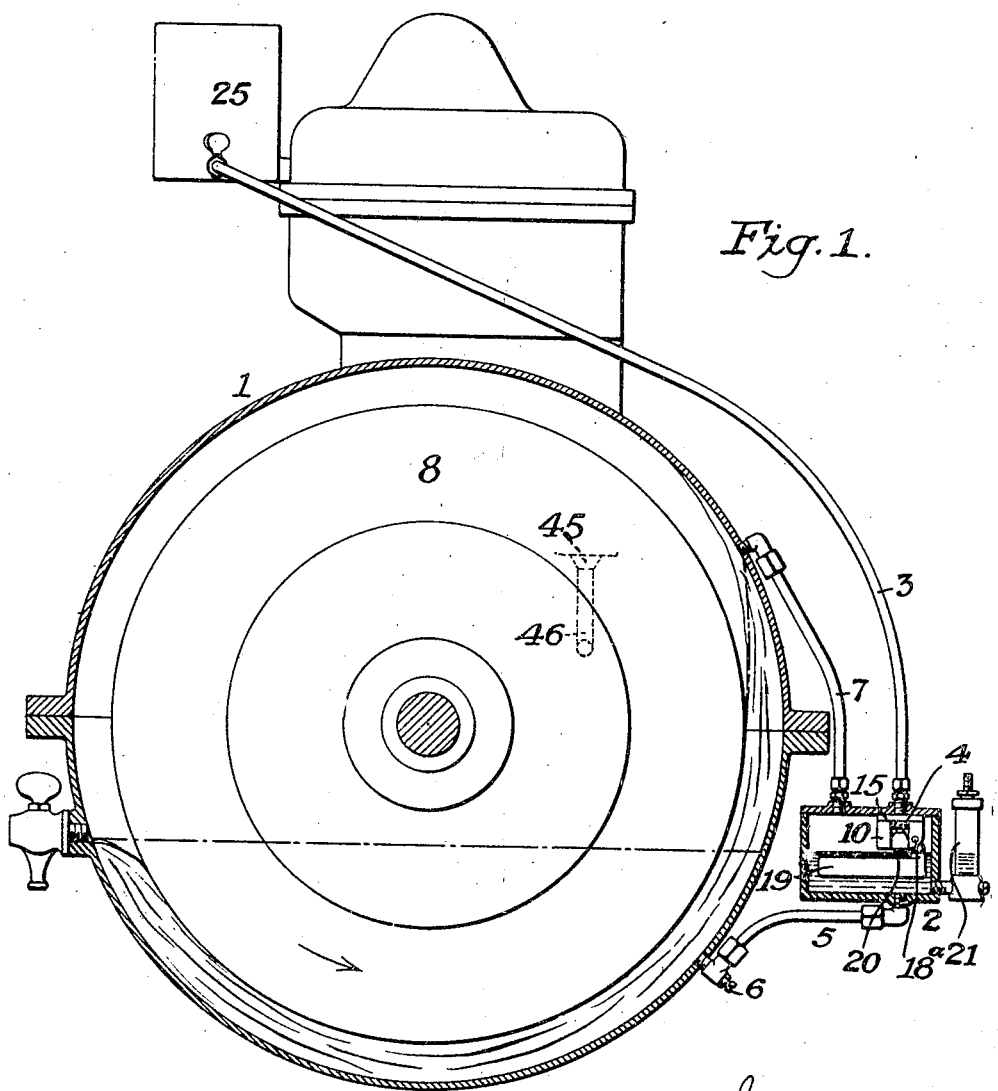

UNITED STATES PATENT OFFICE.

CHARLES FREDERIC SCHELL, OF PHILADELPHIA, PENNSYLVANIA.

OILING SYSTEM.

1,340,687.  Specification of Letters Patent.  Patented May 18, 1920.

Application filed January 26, 1918. Serial No. 213,883.

*To all whom it may concern:*

Be it known that I, CHARLES FREDERIC SCHELL, a subject of the King of Great Britain and Ireland and the Isle of Man, (having declared my intention of becoming a citizen of the United States,) residing in Philadelphia, Pennsylvania, have invented certain Improvements in Oiling Systems, of which the following is a specification.

My invention relates to lubricating systems of engines, more particularly automobile engines; and the object of my invention is to provide a simple and efficient device for maintaining a proper supply of oil in the crank case of an automobile or in any other portion thereof where efficient oiling is required and where there is a natural consumption of oil which must be constantly supplied or renewed to insure proper lubrication of the moving parts to which such oil is applied.

My invention includes an oil receptacle disposed in relative proximity to the crank casing and having communication with the upper and lower portion thereof at its top and bottom whereby circulation through such receptacle can be effected; the latter being provided with a suitable float valve so that a substantially standard level of lubricant can be maintained therein. In order that said receptacle may be kept filled to its normal level controlled by the float valve, I provide a supply reservoir which may be mounted adjacent the top of the cylinders with its outlet or discharge pipe leading to the oil receptacle and with the flow therethrough controlled by the valve in the oil receptacle. The supply reservoir is preferably provided with signaling means or signal actuating means so that when it empties, notice of this fact will be communicated immediately to the operator. When this occurs, however, the operator knows that the oil receptacle and the crank casing have sufficient lubricant for a nominal run to a fresh supply for said supply reservoir.

The lubricating system forming the subject of my invention has been designed particularly for use with the engine of a Ford automobile, but it will be understood that it may be employed with other motors or engines of the same or similar type.

These and other features of my invention are more fully described hereinafter, reference being had to the accompanying drawings, in which:

Figure 1, is a sectional elevation of the crank casing of an engine, showing also the oil receptacle and the reservoir forming part of my invention.

Fig. 2, is an enlarged sectional view of the oil receptacle showing details of the valve employed therewith.

Fig. 3, is an enlarged sectional view of the reservoir showing details of the same, and Fig. 4, is a perspective view illustrating a detail of my invention.

1 represents the crank casing of an automobile engine and 2 is an oil receptacle suitably connected to the frame or chassis of an automobile, or the engine casing, and preferably disposed adjacent the latter. The oil receptacle has an inlet pipe 3 controlled by a float valve 4 hereinafter described, and an outlet pipe 5 leading to the lower portion of the crank casing and preferably provided in some portion of its length with an adjusting or controlling valve 6 serving to limit the rate of feed of the lubricant from the oil receptacle to the crank casing; while said receptacle has another pipe 7 leading therefrom to a point at the side of the crank casing substantially at the highest point to which the oil is carried therein by the action of the fly wheel 8, so that a portion of said oil may flow back into said receptacle whereby circulation is established between the latter and the interior of the crank casing.

The float valve 4 within the oil receptacle is of the needle type, and the valve structure comprises a block 10 centrally apertured as at 11 for the stem 12 of a conically headed needle valve 13 which may be adapted to a seat 14 in a plate 15 disposed above said block and secured with the latter to the upper wall of the oil receptacle. If desired, the plate 15 may be omitted and the seat 14 formed directly in the under side of the upper wall of the oil receptacle.

The block 10 is cut away as indicated at 16 on all sides of the same, and the surfaces 17 between the corner posts 18 formed by such construction are inclined, while the pointed head 13 is of such size as to overlie the passage for its stem 12, so that any oil flowing in via the pipe 3 must flow over the same, and should any grit accompany such oil, there will be no danger of it entering the seat or opening 11 in which the valve stem 12 moves; hence proper movement of the same is assured at all times.

Pivoted to the valve block 10 at 18ª is a float 19 made of any suitable buoyant material not affected by the oil and having an arm 20 underlying the stem of the needle valve so that the latter may be raised and closed thereby when the receptacle fills with oil to the extent provided by the setting of such float and, if desired, the oil receptacle may be provided with a sight glass 21, although this is not essential. The arm 20 may be a spring arm.

A supply reservoir 25 for oil may be suitably mounted under the hood of the automobile, and is conveniently carried by the top of the cylinders. The inlet pipe 3 leading to the oil receptacle 2 is the outlet pipe from the reservoir. The inlet 26 to the reservoir is closed by a suitable plug 27 having a stem 28 upon which is slidably mounted a float 29 with a metal contact 30; another contact 31 carried by the reservoir but insulated therefrom being directly under said movable float so that when the oil in the reservoir is depleted the contact of the float in its lowered position will engage the contact of the reservoir and actuate a signal, which may be a horn, bell, or any other suitable signal with which, of course, a suitable switch will be employed so that such signal may be cut out after its initial operation.

The closure 27 for the supply reservoir is necessarily apertured at 32 in order that the contents of the reservoir may be free to feed to the oil receptacle as the oil is used up from the latter, and this closure is preferably cupped at 33 in the manner illustrated so that any oil which tends to splash out through the apertures 32 will be caught by said cups and be eventually returned to the reservoir.

In conveying the oil from the reservoir to the oil receptacle, I preferably provide the reservoir with a pocket or sump 35 designed to gather any grit or dirt which may be present in the oil; the pipe 3 receiving oil from said supply reservoir for delivery to the oil receptacle 2 being arranged over the sump with its end 36 closed and being provided with a slot 37 on its under side so as to avoid as much as possible all danger of dirt entering the pipe. The sump is preferably provided with a screen 38 through which the dirt may drop, but substantially preventing rise of such dirt, and this sump or pocket may be closed by a cap plug 39 having a draining aperture 40 which may be closed by a set screw plug 41.

The oil is carried up in the crank casing by means of the fly wheel 8, as clearly illustrated in Fig. 1, and passing along the wall of the casing enters the cup 45 (shown in dotted lines); thence passing into the outlet pipe 46 to oil the different parts of the engine, cranks, shafts, &c.

I claim:

1. The combination of a crank casing, an oil receptacle at one side of the crank casing, pipes communicating with the oil receptacle and with the casing so that the oil will circulate through casing and oil receptacle, a supply reservoir, a pipe leading from the bottom of said reservoir to the oil receptacle, a valve structure within the oil receptacle comprising a block having inclined surfaces, a needle valve slidably mounted therein, and a float pivoted thereto and controlling the valve.

2. The combination of a crank casing, an oil receptacle at one side of the crank casing, pipes communicating with the receptacle and with the casing so that the oil will circulate through casing and oil receptacle, a supply reservoir, a pipe leading from the bottom of said reservoir to the oil receptacle, a valve structure within the oil receptacle comprising a block having inclined surfaces, a needle valve mounted therein having an enlarged head; said receptacle having a seat for said valve, and a float pivoted to said block and controlling the needle valve.

3. In an oiling system for internal combustion engines, the combination of a crank casing adapted to contain oil and having an outlet for the delivery of oil for lubricating purposes, an oil receptacle adjacent the crank casing, a pipe connecting the lower portion of the oil receptacle with the lower portion of the casing, a pipe connecting the top of the oil receptacle with the upper portion of the casing; said pipes providing for circulation when the engine is in operation, a pipe for feeding oil to the oil receptacle to maintain the level of oil within the same and within the casing, a float valve for controlling the flow through said casing, a block carried by the oil receptacle in which said valve is movable; said block having draining sides for the inflowing oil and the valve having a head diverting the oil to said draining sides.

CHARLES FREDERIC SCHELL.